United States Patent [19]

Callan

[11] 4,435,706
[45] Mar. 6, 1984

[54] SWITCH NETWORK

[75] Inventor: John E. Callan, Milwaukee, Wis.

[73] Assignee: Allen-Bradley Company, Milwaukee, Wis.

[21] Appl. No.: 317,474

[22] Filed: Nov. 2, 1981

[51] Int. Cl.³ .............................................. H04Q 9/00
[52] U.S. Cl. ........................... 340/825.08; 340/310 A; 340/825.65
[58] Field of Search ....................... 340/825.08, 825.53, 340/825.65, 825.71, 825.1, 310 A, 825.52

[56] References Cited

U.S. PATENT DOCUMENTS

| | | | |
|---|---|---|---|
| 3,866,175 | 2/1975 | Seifert, Jr. et al. | 340/825.52 |
| 3,921,139 | 11/1975 | Hardesty, Jr. et al. | 340/825.52 |
| 4,088,983 | 5/1978 | Crandall | 340/825.52 |
| 4,114,138 | 9/1978 | Demers | 340/825.65 |
| 4,139,737 | 2/1979 | Shimada et al. | 340/310 A |
| 4,287,508 | 9/1981 | Arita et al. | 340/825.1 |

OTHER PUBLICATIONS

"Pulse Codes in Serial Data Communications", Lester S. Sanders, *Computer Design*, Jan. 1982, pp. 203-205, 210.

"Single-Chip Encoder-Decoder Converts NRZ into Manchester Code," Lester Sanders, *Electronics*, Jul. 28, 1982, pp. 105-109.

*Primary Examiner*—Donald J. Yusko
*Attorney, Agent, or Firm*—Barry E. Sammons

[57] ABSTRACT

A plurality of remote stations are sequentially addressed by a master controller to ascertain the status of associated sensing devices. The addresses are each comprised of a sequence of sinusoidal waveforms which are counted by the remote stations and compared with a preselected station number. Each addressed station responds by driving a communication line to a low voltage level for a time interval determined by the status of its associated sensing device.

3 Claims, 4 Drawing Figures

SWITCH NETWORK

BACKGROUND OF THE INVENTION

The field of the invention is data acquisition systems, and particularly, systems for polling remote stations and inputting data from them.

Numerous data acquisition systems are employed in industrial applications. Such systems typically employ a master controller which is often a programmed digital computer, and one or more remote sensing devices, or stations. The master controller "polls", or "addresses", the remote stations and they respond by transmitting data to the master controller. Such data may indicate the state of various sensing devices, such as limit switches, pressure gauges and thermometers. Such systems uniformly communicate information as digital signals in which logic states are represented by specific voltage or current levels.

In certain industrial environments extraordinary measures must be taken to prevent combustion of volatile gases. Where electrical signals must be conveyed from sensing devises located in such an environment, it is common practice to employ expensive conduits and so-called "explosion proof" enclosures for the electrical devices and wiring. More recently, efforts have been made to employ electrical devices which require low-level signals for operation. Such devices and the resulting electrical system are referred to in the art as "intrinsically safe", since they cannot produce enough power to initiate combustion and they comply with Underwriters Laboratories Standard 913.

SUMMARY OF THE INVENTION

The present invention relates to a system for electrically acquiring status data from sensors located in hazardous areas, and particularly, a system for polling remote stations connected to such sensing devices with low level signals. The system includes a master controller which transmits a selected number of sinusoidal waveforms over a serial line to a plurality of remote stations and means at each station for counting the number of such waveforms and responding when its station number is sensed. The response from the station is a logic level signal which is asserted on the serial line for a time interval that is indicative of the state of the sensing device to which it is attached. The master controller thus sequentially addresses each remote station and receives its response using low power level signals which do not contain arc-producing components.

A general object of the invention is to acquire data from remote locations using a single communications line. The master controller polls each remote station through common lines by generating its address in the form of a selected number of sinusoidal waveforms. When thus polled, the remote station responds over the same line.

Another object of the invention is to reduce high level signals on the communications line. In contrast to digital communications systems which employ pulses containing harmonics of many frequencies, the present system employs relatively low frequency sinusoidal waveforms to convey address information. It has been demonstrated empirically that for a given power level, information can more accurately be communicated using sinusoidal waveforms.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

DESCRIPTION OF THE PREFERRED EMBODIMENT

Figure 1:
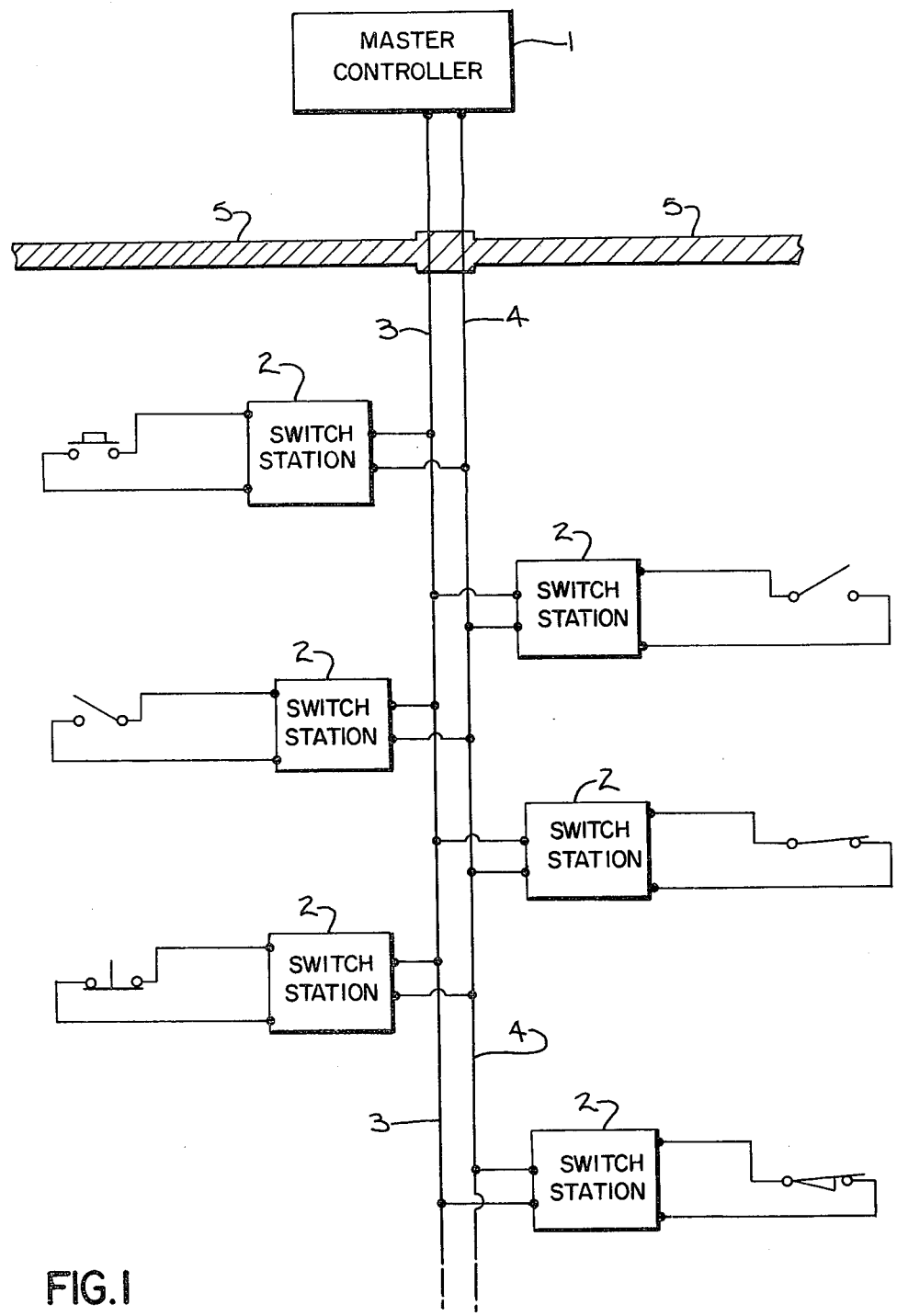
FIG. 1 is a block diagram of a preferred embodiment of a switch network which employs the present invention.

Referring to FIG. 1, the switch network includes a master controller 1 which is connected to one or more switch stations 2 by a pair of lines 3 and 4. Power for the switch stations 2 can be supplied from an intrinsically-safe power supply source through a second set of lines (not shown in the drawings). Each switch station 2 connects to a sensing device, which in FIG. 1 are switches of various types. Such sensing devices are typically connected to machines and may include push-button switches, limit switches, proximity switches, thermostatic switches and photoelectric switches. If the switch stations 2 and their sensing devices are located in a hazardous area, a barrier 5 may be employed to isolate the master controller 1. It is an advantage of the present invention that low level signals may be employed to communicate information between the stations 2 which are located in such a hazardous area and the master controller 1.

Figure 2:
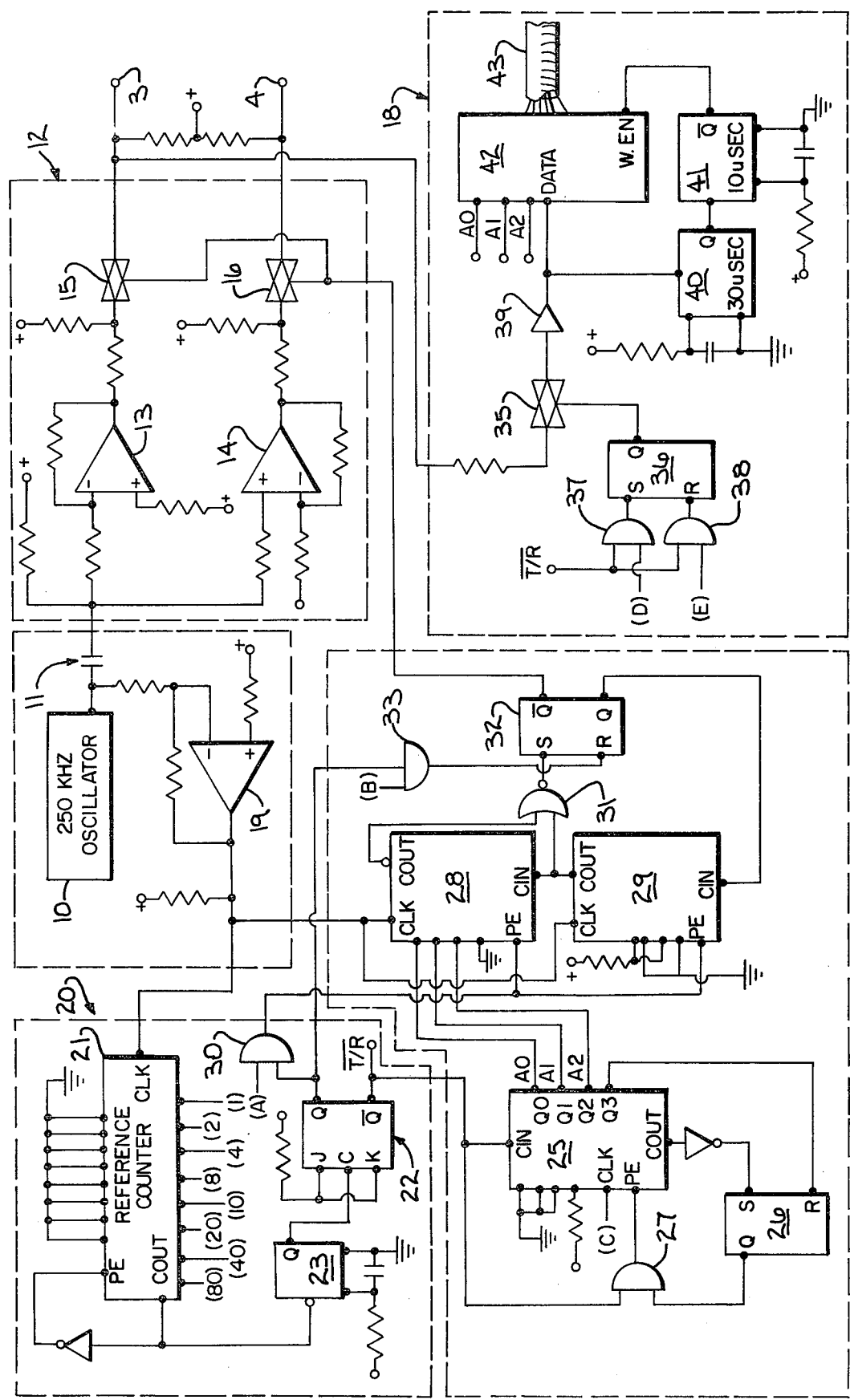
FIG. 2 is an electrical schematic diagram of the master controller which forms part of the switch network of FIG. 1.
Figure 4:
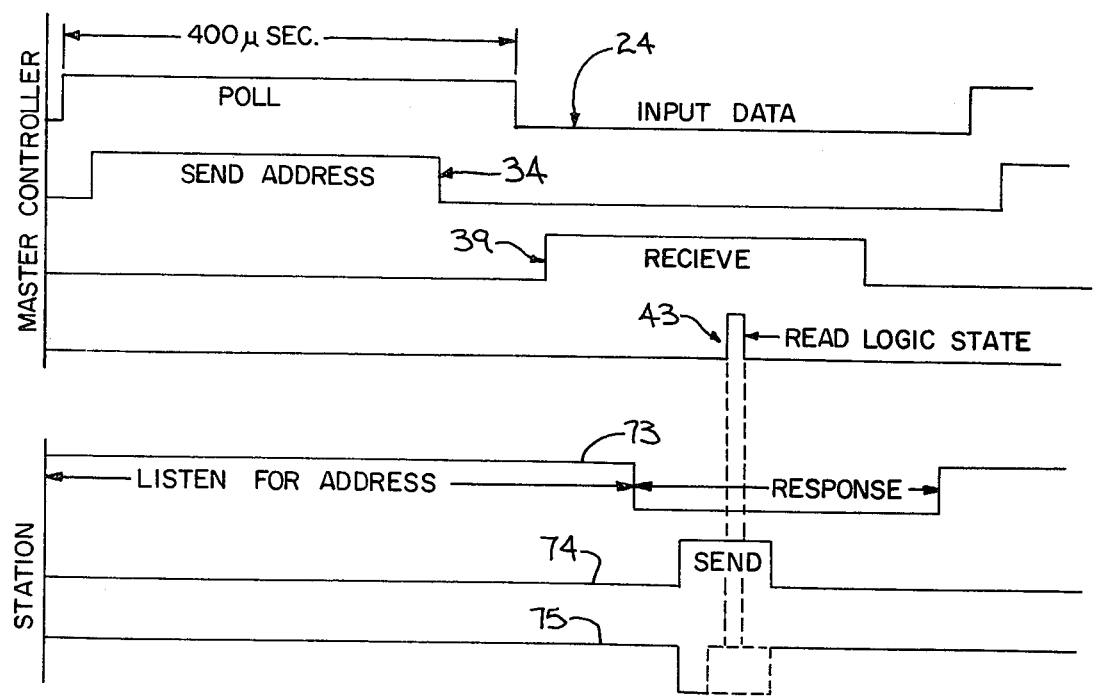
FIG. 4 is a timing diagram for the switch network of FIG. 1.

Referring particularly to FIGS. 2 and 4, the master controller 1 includes a 250 kilohertz oscillator 10 which generates sinusoidal waveforms through a coupling capacitor 11 to a line driver circuit 12. The line driver circuit 12 includes a pair of operational amplifiers 13 and 14 which receive the sinusoidal waveform and apply it to respective lines 3 and 4 through analog switches 15 and 16. As will be described in more detail below, an address generator circuit 17 controls the operation of the analog switches 15 and 16 to enable a preselected number of such sinusoidal waveforms to be applied to the lines 3 and 4. This preselected number represents the address of one of the remote stations 2. The addressed station 2 replys by holding the line 3 at ground potential for a preselected time period after receiving its address. The duration of this reply signal indicates the state of the station's sensing device and this reply is recorded by a receiver circuit 18 which also connects to the line 3.

The oscillator 10 also provides the clock signal for the master controller 1. The 250 kilohertz sinusoidal waveform is applied to an operational amplifier 19 which converts it to a logic digital clock signal. This system clock signal is applied to the address generator circuit 17 and to a reference generator circuit 20.

Referring still to FIGS. 2 and 4, the reference generator circuit 20 establishes a series of time periods which are employed to control the operation of the system. It includes a reference counter 21 which is comprised of a pair of 4-bit decade counters (MC14029). The counter 21 is preset to zero and then it is counted up to "99" by the 250 kilohertz clock signal to define a 400 microsecond time period. The carry output (COUT) of the counter 21 resets it to zero at the end of this period and the carry output also clocks a J-K flip-flop 22 through a monostable multivibrator 23. The output of the J-K flip-flop 22 provides a basic 800 microsecond timing signal which is indicated as "base period" 24 in FIG. 4. The remaining outputs (1, 2, 4, 8, 10, 20, 40 and 80) of the reference counter 21 are employed to define other time periods within the 800 microsecond base period. As will be explained in more detail below, these signals are employed to control the timing of various events which occur in the master controller 1.

During the first half of each 800 microsecond base period, a station address is generated on the lines 3 and 4. This is accomplished by enabling the analog switches 15 and 16 near the beginning of the 400 microsecond "polling" portion of the base period, counting the number of 250 kilohertz waveforms generated on the lines 3 and 4, and then disabling the analog switches 15 and 16 when the preselected number, or address, is reached. During the second half of each basic 800 microsecond time period, one of the remote stations 2 determines that it has been addressed, and that station drives the line 3 to ground potential for 15 microseconds if its sensing device is closed or for 60 microseconds if its sensing device is open.

Referring to FIGS. 2 and 4, the address generated by the master controller 1 during any single base period is determined by a 4-bit decade counter 25 (MC14029). The counter 25 is preset to zero and thereafter it is incremented by one count at the beginning of each base period by a signal (C) which applied to its clock terminal CLK. The signal (C) is generated when the (1) output of the reference counter 21 is at a logic high and the remaining counter outputs are low. The counter 25 is thus incremented one count at the beginning of each base period and successive binary coded addresses are generated by the counter 25 at its outputs A0, A1 and A2. When the counter's Q3 output goes high, a flip-flop 26 is set and the counter 25 is preset to zero by an AND gate 27 at the beginning of the next base period.

The address generated by counter 25 is applied to the inputs of a 4-bit decade counter 28 (MC14029). The counter 28 is cascaded with another 4-bit decade counter 29 (MC14029), and both are preset through an AND gate 30 at the beginning of each base period when signal (A) goes to a logic high voltage. Signal (A) is high when outputs (2) and (4) on the reference counter 21 are high and its remaining outputs are low. The counter 29 is preset to "5" and the counters are then both counted down by the 250 kilohertz clock signal generated by the operational amplifier 19. The total number of counts in the counters 28 and 29 is thus ten times the value indicated by lines A0, A1 and A2 plus five. When both counters are decremented to zero, an OR gate 31 is enabled to set a flip-flop 32 which controls the analog switches 15 and 16.

The flip-flop 32 is reset at the beginning of each base period by an AND gate 33. A signal (B) which drives the AND gate 33 goes to a logic high voltage when the (8) output of the reference counter 21 is high and its remaining outputs are low. When thus reset, the flip-flop 32 turns the analog switches 15 and 16 on and sinusoidal waveforms are applied to the lines 3 and 4 until the flip-flop 32 is set by the NOR gate 31. Because the counters 28 and 29 are decremented in synchronism with the generated waveforms, the number of waveforms, and hence the address generated on the lines 3 and 4, corresponds to the count which is preset into the counters 28 and 29 at the beginning of each base period. This period during which the station address is generated on the lines 3 and 4 is indicated by line 34 in FIG. 4.

After the address is generated and during the second half of the base period, an analog switch 35 is turned on to monitor the voltage level of line 3. Analog switch 35 is controlled by an RS flip-flop 36, which in turn is operated by a pair of AND gates 37 and 38. The flip-flop 36 is set when signal (D)=(10)·($\overline{20}$)·($\overline{40}$)·($\overline{80}$) goes high and $\overline{T/R}$ is at a logic high voltage. The flip-flop 36 is reset when signal (E)=($\overline{10}$)·($\overline{20}$)·($\overline{40}$)·(80) goes high and $\overline{T/R}$ is high. The resulting "receive" period is indicated as line 39 in FIG. 4.

When the line 3 is pulled low by the addressed station 2, a logic low voltage is generated at the output of a line receiver 39 which connects to the output of analog switch 35. This transition is applied to a first monostable multivibrator 40 which generates a 30 microsecond pulse to a second monostable multivibrator 41. The multivibrator 41 in turn generates a 10 microsecond logic low pulse to a write enable terminal on an 8-bit addressable latch 42 (MC14099). A 10 microsecond "read" period is thus established 30 microseconds after the line 3 is driven low by the addressed station. This "read" pulse is indicated in FIG. 4 by line 43.

The 8-bit addressable latch stores the current state of each of the sensing devices associated with the stations 2. When a station 2 is addressed, the same address is applied to the addressable latch 42 by the lines A0, A1 and A2 from the counter 25. The output of the buffer 39 connects to a data input terminal on the addressable latch 42 and the logic state applied to this input terminal is stored in the addressed location of the latch 42 when the 10 microsecond read pulse is received. Thus, if the remote station 2 drives the line 3 low for 15 microseconds (sensing device closed) the line 3 will have returned to a high level before the read pulse is generated, and a "1" will be stored in the latch 42 for that station. On the other hand, if the addressed station holds the line 3 low for 60 microseconds, a logic low, or "0", will be stored in the addressable latch 42. The eight data bits stored in the latch 42 are presented in parallel at eight output terminals which connect to a data bus 43. The state of any of the eight sensing devices associated with the remote stations 2 can thus be easily examined for display or control purposes.

It should be apparent to those skilled in the art that the master controller 1 may take a number of different forms. It may be a separate, integral unit or it may form part of a programmable controller such as those disclosed in U.S. Pat. Nos. 4,266,281 and 4,165,534. Also, the number of stations 2 addressed by the master controller 1 may be easily increased or decreased depending on the particular application, and many of the functions performed by the master controller 1 may be accomplished using a properly programmed microprocessor.

Figure 3:
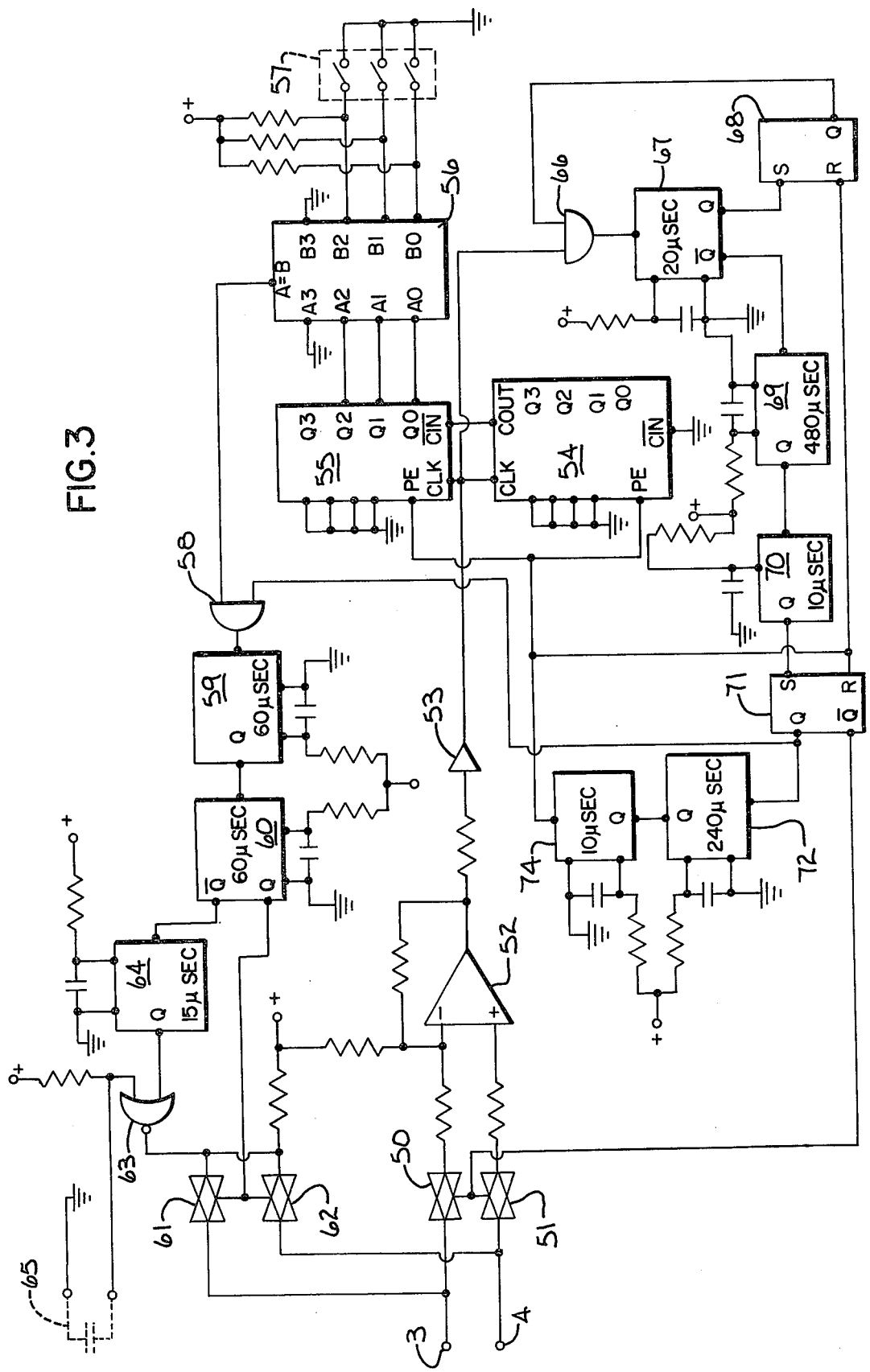
FIG. 3 is an electrical schematic diagram of a switch station which forms part of the switch network of FIG. 1.

Referring particularly to FIGS. 3 and 4, each remote station 2 includes a pair of analog switches 50 and 51 which connect the lines 3 and 4 to the inputs of a differential operational amplifier 52. The 250 kilohertz sinusoidal waveforms on the lines 3 and 4 drive the amplifier 52 into saturation and the resulting output waveform is applied to a buffer 53 which converts it to a 250 kilohertz logic level clock signal. The output of the buffer 53 connects to the clock terminal on a pair of 4-bit decade counters 54 and 55, and the number of 250 kilohertz pulses are thus counted. The counter 55 is the most significant digit counter and its three outputs Q0, Q1 and Q2, connect to the "A" inputs on a 4-bit comparator circuit 56. The corresponding "B" inputs on the comparator 56 connect to a logic high voltage source through pull-up resistors and they connect to a 3-pole dip switch 57. By selectively setting the dip switches 57, a 3-bit station number is generated and is compared with the station address generated on the lines 3 and 4.

The output of the comparator 56 is applied to an AND gate 58, and if the station 2 has been addressed, the AND gate 58 is enabled and a monostable multivibrator 59 is triggered. When thus triggered, the multivibrator 59 triggers a second monostable multivibrator 60, and the multivibrator 60 in turn generates an enabling pulse to a pair of analog switches 61 and 62. As a result, the analog switches 61 and 62 couple the output of a NOR gate 63 to the lines 3 and 4 for a period of 60 microseconds.

The multivibrator 60 triggers a monostable multivibrator 64 at the same moment it enables the analog switches 61 and 62. The output of the multivibrator 64 connects to one input of the NOR gate 63, and as a result, it drives the lines 3 and 4 to a logic low voltage level for a period of 15 microseconds. A second input on the NOR gate 63, however, connects to a logic low voltage through the external sensing device indicated at 65, and if the device 65 is closed, the line 3 is driven low during the entire 60 microsecond period. In other words, if the sensing device 65 is open, the line 3 is driven low for 15 microseconds when the station 2 is addressed, or it is driven low for 60 microseconds if the sensing device 65 is closed.

Referring still to FIGS. 3 and 4, the sinusoidal waveforms input to the amplifier 52 also serve to establish a reference signal which is employed to control the analog switches 50 and 51 and the AND gate 58. More specifically, the output of the buffer 53 is applied to the input of an AND gate 66, and when the first sinusoidal waveform is received, the AND gate 66 triggers a monostable multivibrator 67. The multivibrator 67 sets a flip-flop 68 to disable the AND gate 66 during the remainder of the base period, and it triggers second and third monostable multivibrators 69 and 70. The third multivibrator 70 generates a 10 microsecond pulse to set an R-S flip-flop 71 approximately 500 microseconds after the sinusoidal waveforms are first sensed. The flip-flop 71 in turn disables the analog switches 50 and 51 to terminate the remote station's listening period, and it enables the AND gate 58 to allow a response from the station 2 if it was addressed.

The flip-flop 71 also triggers a monostable multivibrator 72 which defines a 240 microsecond "response" period. During this period the analog switches 50 and 51 are disabled and the analog switches 61 and 62 in the addressed station are enabled for 60 microseconds. The line 73 in FIG. 4 indicates the listening and responsive periods for each station 2. The line 74 in FIG. 4 indicates the 60 microsecond period in which the analog switches 61 and 62 are enabled, and the line 75 indicates the signal applied to the analog switches 61 and 62. At the end of the response period, the multivibrator 72 triggers a monostable multivibrator 74 which generates a 10 microsecond reset pulse. This reset pulse presets the decade counters 54 and 55 to zero and it resets the flip-flops 68 and 71. The remote station 2 is thus prepared for the beginning of the next base period in which the master controller 1 generates another station address.

The master controller 1 generates a sequence of station addresses, with one address being transmitted during each base period. The addressed station 2 responds with the logic state of its associated sensing device during the same base period, and the master controller stores this response. After each remote station 2 has been addressed, the cycle repeats and the status of the sensing devices are thus continuously scanned by the master controller 1.

I claim:

1. A network for ascertaining the state of a plurality of sensing devices, which comprises:
   a communications line;
   a master controller connected to the communications line for generating address signals thereon, the master controller including,
   (a) address generator means for establishing a sequence of station numbers,
   (b) oscillator means for generating sinusoidal waveforms,
   (c) analog switch means for coupling the oscillator means to the communications line, the analog switch means being operated by the address generator means to sequentially generate series of sinusoidal waveforms on the communications line, the number of such waveforms in each series being determined by the station number established by the address generator means, and
   (d) a receiver circuit coupled to the communications line and being operable to read the voltage level of the communications line a predetermined time interval after each series of sinusoidal waveforms is generated; and a remote station connected to the communications line and connected to an associated sensing device, the remote station including:
   (e) counter means for counting the number of sinusoidal waveforms in each series,
   (f) comparator means coupled to the counter means and being operable to generate an enabling signal when the counted number of sinusoidal waveforms corresponds to a preset station number, and
   (g) response means coupled to the comparator means and the station's associated sensing device for generating a preselected voltage level on the communications line during the predetermined time interval after the series of sinusoidal waveforms is generated when the enabling signal is present, the voltage level being indicative of the state of the station's associated sensing device.

2. The network as recited in claim 1 in which a plurality of remote stations are connected to the communications line and each remote station has a distinct preset station number, and the master controller generates a separate series of sinusoidal waveforms for each of the distinct preset station numbers.

3. The network as recited in claim 1 in which the response means generates the preselected voltage level on the communication line for a first predetermined time interval when the associated sensing device is in one state, and for a second predetermined time interval when the associated sensing device is in another state.

* * * * *